(No Model.)
C. SCHNEIDER & C. PFANNE.
PULLEY BRACKET AND BLOCK.
No. 298,241.        Patented May 6, 1884.
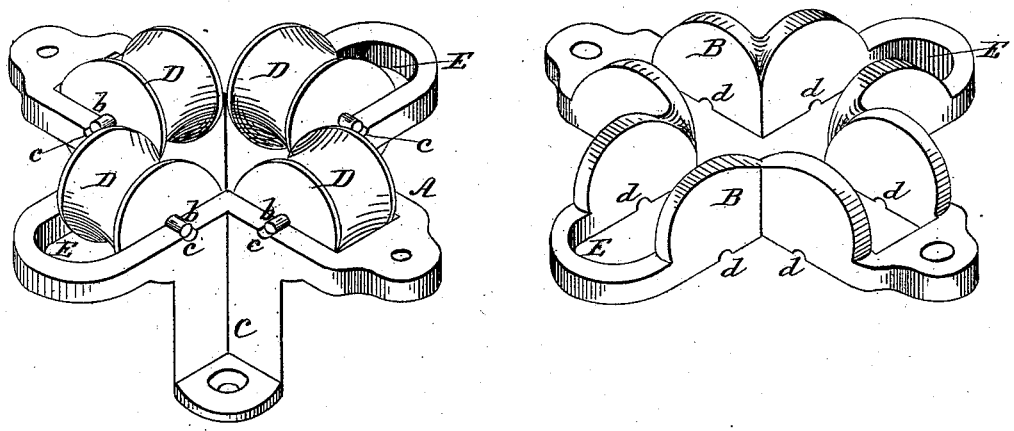
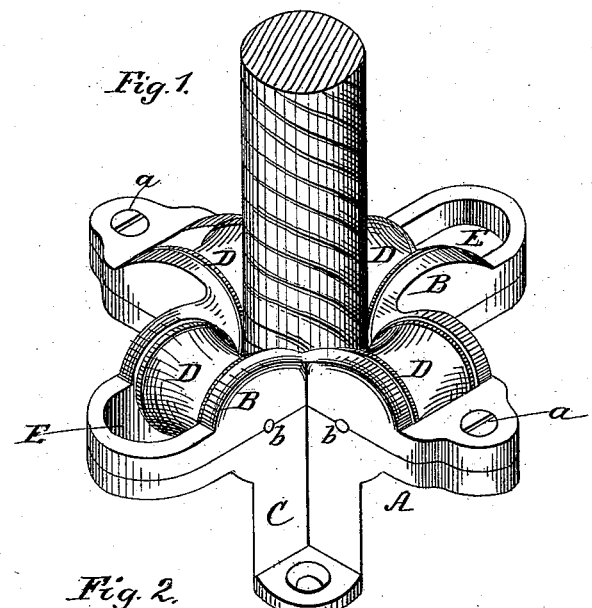
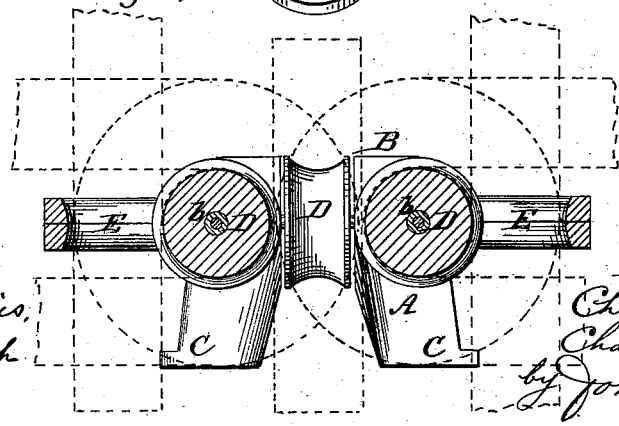

UNITED STATES PATENT OFFICE.

CHARLES SCHNEIDER AND CHARLES PFANNE, OF WASHINGTON, D. C.

PULLEY BRACKET AND BLOCK.

SPECIFICATION forming part of Letters Patent No. 298,241, dated May 6, 1884.

Application filed March 19, 1884. (No model.)

*To all whom it may concern:*

Be it known that we, CHARLES SCHNEIDER and CHARLES PFANNE, citizens of the United States, residing at Washington, in the District of Columbia, have invented new and useful Improvements in Pulley Brackets and Blocks, of which the following is a specification.

Our invention consists of a pulley-bracket having a circular eye for the rope or cord, formed of a nest of pulleys having grooved surfaces each the segment of the circle of the eye, the object being to produce a pulley bracket or block having a confining-eye formed of curved rolling bearings, so that the cord will be held in place and supported upon any part of the walls of a circle, and thereby prevent the possible displacement of the cord, and permitting it to be pulled in any direction without contact with the housing or bracket. The construction is such as to adapt it for a cord operating through the eye only, or over a pulley forming a part only of the wall of the eye. It is especially adapted for doors closed by a cord and weight, for ropes passing through floors, for the pulley-rope of elevators, and, generally, for use with pulley ropes and cords of awnings, and for cables.

Referring to the accompanying drawings, Figure 1 represents a view in perspective of our improved pulley-bracket; Fig. 2, a section through two of the nest of eye-forming pulleys, showing by dotted lines the various directions in which the cord or rope can be used; and Fig. 3, the device showing the bracket of two parts, for confining the eye-forming pulleys, the parts being separated.

The bracket is made in two cast parts—the base or attaching part A, and a cap or plate, B, for confining the pulleys in place. The base part is formed of four connected or open arms arranged at right angles to each other. The opening in each forms also a center opening, and it has suitable flanged legs, C, by which it is screwed to the wall, floor, ceiling, or other place, in the desired position to suit the arrangement and position of the rope or cord. The cap is of corresponding form, and is secured by two of its arms, by screws $a\ a$, to the base. In the opening of each arm is placed a pulley, D, having grooved surfaces, and arranged to form a central circular eye, the grooved surface of each pulley forming a segment of said eye. Each pulley has an iron axis-pin, $b$, and the arms of the base and cap are each cast with a semi-cylindrical groove, $c\ d$, to receive the said pulley axis-pins, so that the securing of the cap confines the pulleys in place to form the eye of rolling surfaces for the cord. One, two, or all of the open arms may be extended to form each a supplemental eye, E, between the end of the arm and the pulley, so that the cord may be passed through the central and the supplemental eyes, to suit the requirement.

The screws $a\ a$ may be fastened by nuts, or screwed into tops in the base-arms. In whatever direction the cord is drawn through the eye it has a rolling bearing and is confined in place. The device may be cast of any suitable metal and of any suitable size, and can be applied in any position, as a bracket or as a block.

We claim—

1. The pulley-bracket herein described, consisting of a bracket and a nest of grooved pulleys arranged therein to form a circular central eye of rolling surfaces for the rope or cord, substantially as herein set forth.

2. A circular pulley-eye formed of a nest of grooved pulleys, combined with a bracket consisting of an attaching base part and a confining cap part, each having open arms arranged at right angles to each other, and grooved to receive the axis-pins of pulleys arranged in the opening of each arm, substantially as shown and described.

3. A pulley-bracket consisting of a bracket and a nest of grooved pulleys arranged therein to form a circular central eye, and a supplemental eye for one or more of the nest of pulleys, substantially as shown and described.

In testimony whereof we have hereunto set our hands in the presence of two subscribing witnesses.

CHARLES SCHNEIDER.
CHAS. PFANNE.

Witnesses:
A. E. H. JOHNSON,
J. W. HAMILTON JOHNSON.